May 17, 1955 H. A. TOULMIN, JR 2,708,627
METHOD OF EXTRACTING PEEL OILS AND OTHER WASTE PRODUCTS
Filed Oct. 21, 1950
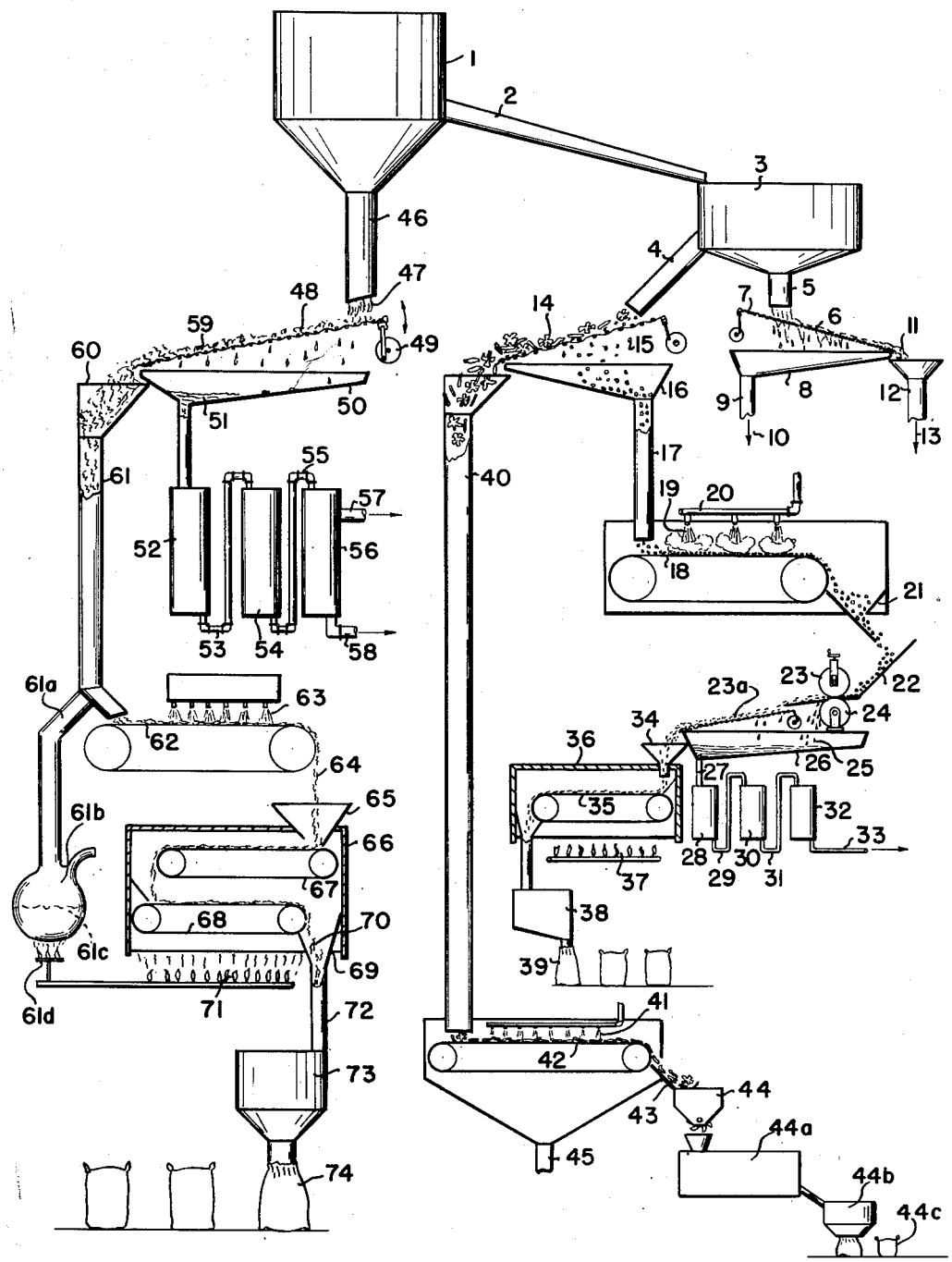
INVENTOR
HARRY A. TOULMIN JR.
By Toulmin & Toulmin
ATTORNEYS United States Patent Office 2,708,627
Patented May 17, 1955

2,708,627

METHOD OF EXTRACTING PEEL OILS AND OTHER WASTE PRODUCTS

Harry A. Toulmin, Jr., Dayton, Ohio, assignor to The Commonwealth Engineering Company of Ohio, Dayton, Ohio, a corporation of Ohio Application October 21, 1950, Serial No. 191,389

2 Claims. (Cl. 99—2)

This invention relates to apparatus and process for the production of stock food, human food and oils, principally from citrus fruits.

It is an object of this invention to provide means of extracting citrus juices free from oils from the peel and oils from the seeds, and with substantially no bacteriological contamination.

It is a further object to provide means of reducing the flavedo to granular form and for extracting from the flavedo the peel oil and utilizing the residue as either human or stock food.

It is a further object to provide means of separating the juice from the albedo and seeds.

It is an object to provide means of converting the albedo into stock or human food and to clean and dry the seeds and thereafter crush them and extract the oil for use in industrial finishes and the like and to provide a protein stock food from the crushed hulls of the seeds.

Heretofore in the art, citrus fruits and the like have been cut in half, the juice pressed and in the pressing of the juice the peel oil and the oil from the crushed seeds has been entrained in the orange juice. This has led to undesirable taste and expensive process of the refinement of the juice, which has destroyed its delicate flavors. At the same time the refuse consisting of the halves of the rinds comprising the flavedo and albedo, together with the seeds in their crushed condition, have been sent to a stock food plant where they are treated with lime because of the slimy character of the mass, de-watered, shredded, limed again and dried and thereafter pulverized or otherwise broken down to form stock food. The water that is unbound by the treatment of lime then is distilled into molasses for further fortification of stock foods.

In the instant invention these disadvantages are eliminated and an improved citrus juice, improved stock and human foods and means of recovering the valuable oils such as peel oil and seed oil, are provided.

Turning to the drawing, 1 designates a de-oiling peeler such as set forth in co-pending applications, Serial Nos. 172,161 and 172,162 of July 5, 1950, in the names of Ralph G. Lohre and Joseph Pitzer.

Numeral 2 indicates the trough conveyor for conveying the citrus fruit after the flavedo has been abraded into granules from the surface of the fruit and washed away with a stream of water. The fruit within the albedo then enters a press 3 as shown in the co-pending applications Serial Nos. 172,161, now Patent No. 2,676,633, and 172,162, now Patent No. 2,682,832, of Ralph G. Lohre and Joseph Pitzer, filed July 5, 1950. In this press the fruit is compressed and due to the compression the pressure on the juice ruptures the albedo which is discharged with the seeds through the trough 4. Due to the velocity of the expulsion of the juice, the seeds are swept from the albedo in whole condition. This prevents the juice from being contaminated by seed oil.

Returning to the press 3, the juice makes its exit through the chute 5, thence it passes through the screen 6 that is vibrated by the arm 7. The juice then passes into the trough 8 pipe 9 to dehydrating apparatus generally designated 10.

The pulp from the press 3 indicated on the screen 6 as at 11 passes down the pipe 12 to a suitable receptacle 13 whence it is either redistributed into the juice after dehydration or is separately sold for such uses as making ambrosia.

Turning to the albedo 14 which passes the vibrating screen 15, it will be observed that the whole seeds are shaken through the screen and pass through the hopper 16 pipe 17 onto the belt 18 where they are washed and dried by steam sprays 19 from the pipe 20. Thence they pass through the hopper 21 to the chute 22 between crushing rolls 23 and 24. The crushed seeds pass over the screen 23a while the oil drops into the trough 26 as indicated at 25. This seed oil then passes through the pipe 27 to a series of stills 28 connected by pipe 29 to still 30 and still 30 is connected by pipe 31 to pipe 32 whence the oil passes out of pipe 33 to storage.

The hopper 34 receives the crushed seeds which form a source of protein. These crushed seeds pass on the conveyor 35 through the oven 36 heated by the burners 37. They thence pass into the bag machine 38 and into bags 39.

The albedo 14 passes through the chute 40 to a conveyor 42 under limer fortification sprays 41 which may apply lime and other minerals. The pipe 45 supplies heat for the drying of this material and thence the albedo passes into a shredder over the chute 43 into shredder 44 and thence into a dryer 44a whence it passes into the bag machine 44b into bags 44c.

The refuse of the flavedo which passes through the pipe 46 with the entrained water makes its exit at 47 on to the vibrating screen 48. This screen is actuated by a vibrator 49. The water carrying the peel oil passes through the screen into the trough 50 as at 51 and thence into still 52, through pipe 53 to still 54 through pipe 55 to still 56 whence the oil rises and passes out the pipe 57 and the waste water through pipe 58.

In order to extract the pigments, vitamins, the carotenoids and xanthophyll it is desirable to alternately treat the flavedo refuse by passing it through the pipe 61a into the still 61b in the presence of hydrocarbons at 61c and optionally submitted to heat at 61d in order to extract carotene and vitamin A as well as separate xanthophyll.

The flavedo refuse which is in granular form passes through the hopper 60 through pipe 61 on to the belt 62 where it is provided with fortification minerals to enhance its value as stock food. So treated it passes at 64 into the hopper 65 and thence onto the belt conveyor 67 and thence to a second conveyor 68 into the hopper 70.

These conveyors are within the oven 66 heated by the heat 71. The dried granular refuse so fortified then passes through the hopper 70, the pipe 72 into the bag machine 73 and the bags 74.

The seeds contain valuable oils principally useful in the industrial finishing industry such as palmitic, stearic, arachidic, linolenic, linoleic and oleic. It is important to prevent this oil from ever entering the citrus juice because of the extremely bitter taste of a bitter principal in the oil identified as limonin ($C_{20}H_{30}O_8$). The seed itself when separated from the oil contains approximately 16% protein and provides a satisfactory protein meal. As these seeds have a very high content of oil it makes them of marked commercial interest as the seeds, when dried, contain between 30% and 35% oil and occasionally as much as 37% to 50%. The oil is a semi-dry oil with composition drying properties approximately similar to those of cottonseed oil.

The albedo, when produced by this process, entirely free from the bitter principle in the crushed seeds, runs approximately 44% sugar, 33% cellulose and 20% pectic substances. These percentages exist after the extraction of the water which runs as high as 80%. By the instant process the minimum of liming is necessary and therefore the minimum of change of the taste.

The flavedo, when separated according to this process from the albedo becomes a satisfactory source of carotene ($C_{40}H_{56}$) and xanthophyll ($C_{40}H_{56}O_2$). These carotenoid pigments are responsible for the yellow color of the flavedo. As they are lipochrome pigments which are insoluble in water, it is desirable to extract them from the finished product in fats and oils. These pigments account for the yellow or dark red color of the essential oils in citrus. The carotenoids or hydrocarbons containing forty carbon atoms are readily emissible with hydrocarbons. The carotene occurs in three isomers differing in the position of their eleven double bonds. This pigment can be hydrolyzed into a fat soluble vitamin A.

It will be apparent that a large volume of citrus fruit flavedo refuse produced in granular form and either before or after drying, provides a source for extraction of the peel oil and provides a source for vitamins and pigments of substantial value. It provides an important source of carotene and therefore of vitamin A. In some instances it is found more desirable to immediately deliver the wet granular flavedo for extraction before drying. After the oils are extracted the residue contains the yellow and orange pigments, particularly carotene in very high concentrations.

The result of this progressive accumulation of the basic components of citrus fruit is to produce each one of the components in its uncontaminated purity and to do so automatically and progressively in order to utilize all the elements of the fruit for foods, chemicals, vitamins, food oils and industrial oils.

It will thus be seen that we have produced the following products: orange juice free of offensive oils; flavedo in granular form for stock food or human food such as toasted granules properly flavored with molasses and vitamins; peel oils; seed oil; albedo for stock food and crushed seeds as protein for additional stock or poultry food.

The dehydration of the citrus juice when it is desired to be concentrated is practiced in accordance with a typical application Serial No. 170,285 of Wenzelberger, filed June 26, 1950.

It will be understood that I desire to comprehend within my claims such changes, modifications and adjustments in mechanisms and methods as it may be necessary to adapt this process and mechanism to a variety of fruits, both citrus and noncitrus. It will be understood that suitable modification may be made without departing from the spirit of the invention.

I claim:

1. In a process of treating raw whole citrus fruits to recover food values therefrom, and which citrus fruits comprise an outer flavedo layer containing peel oil and an inner albedo portion composed of pulp cells containing the juice and seeds, which consists in abrading the raw whole fruit to remove the flavedo layer as granular particles and to release the peel oil therefrom, washing the fruit with water during abrading of the same and collecting the flavedo granules and peel oil as an aqueous slurry, mechanically separating said flavedo granules from the aqueous peel oil phase, subjecting the aqueous slurry of flavedo granules to distillation to separate the peel oil, compressing the residual fruit portion enclosed by the albedo to cause rupture of the same and expulsion of the fruit juice and seeds, said compression being limited so as to expell the seeds in their whole uncrushed condition, collecting said juice and seeds, mechanically separating the seeds from the juice and flavedo residue, and crushing the seeds to recover the seed oil.

2. In a process of treating raw whole citrus fruits to recover food values therefrom, and which citrus fruits comprise an outer flavedo layer containing peel oil and an inner albedo portion composed of pulp cells containing the juice and seeds, which consists in abrading the raw whole fruit to remove the flavedo layer as granular particles and to release the peel oil therefrom, washing the fruit with water during abrading of the same and collecting the flavedo granules and peel oil as an aqueous slurry, mechanically separating said flavedo granules from the aqueous peel oil phase, distilling the aqueous-oil phase to remove the peel oil, subjecting the separated granular flavedo particles to distillation in the presence of a hydrocarbon solvent to extract and recover carotene and xanthophyll, compressing the residual fruit portion enclosed by the albedo to cause rupture of the same and expulsion of the fruit juice and seeds, said compression being limited so as to expell the seeds in their whole uncrushed condition, collecting said juice and seeds, mechanically separating the seeds from the juice and albedo residue, crushing the seeds to recover the seed oil, and subjecting the resultant refuse flavedo and albedo material, to a drying heat treatment to produce a finished stock food.

References Cited in the file of this patent

UNITED STATES PATENTS

| | | |
|---|---|---|
| 1,197,442 | Burke | Sept. 5, 1916 |
| 1,991,242 | Cole et al. | Feb. 12, 1935 |
| 2,186,907 | Overton | Jan. 9, 1940 |
| 2,301,901 | McKinnis | Nov. 10, 1942 |
| 2,548,510 | Neal | Apr. 10, 1951 |

OTHER REFERENCES

"Citrus Products," 1949, pages 77, 78, 182 and 183.